US010535372B2

(12) United States Patent
Fisher et al.

(10) Patent No.: US 10,535,372 B2
(45) Date of Patent: Jan. 14, 2020

(54) SYSTEM FOR RECORDING AND SYNCHRONIZING AUDIO AND VIDEO ASSOCIATED WITH A UAV FLIGHT

(71) Applicant: Vantage Robotics, LLC, San Francisco, CA (US)

(72) Inventors: Tobin Fisher, San Francisco, CA (US); Johannes Becker Van Niekerk, Livermore, CA (US)

(73) Assignee: VANTAGE ROBOTICS, LLC, San Francisco, CA (US)

( * ) Notice: Subject to any disclaimer, the term of this patent is extended or adjusted under 35 U.S.C. 154(b) by 0 days.

(21) Appl. No.: 15/220,263

(22) Filed: Jul. 26, 2016

(65) Prior Publication Data
US 2017/0053674 A1 Feb. 23, 2017

Related U.S. Application Data

(60) Provisional application No. 62/197,493, filed on Jul. 27, 2015.

(51) Int. Cl.
*G11B 27/10* (2006.01)
*B64C 39/02* (2006.01)
*B64D 47/08* (2006.01)
*G01S 19/14* (2010.01)
*G11B 20/10* (2006.01)
(Continued)

(52) U.S. Cl.
CPC ............ *G11B 27/10* (2013.01); *B64C 39/024* (2013.01); *B64D 47/08* (2013.01); *G01S 19/14* (2013.01);
(Continued)

(58) Field of Classification Search
CPC .............. G11B 27/10; G11B 20/10527; G11B 27/3036; B64C 38/024; B64C 47/08
See application file for complete search history.

(56) References Cited

U.S. PATENT DOCUMENTS 5,479,351 A 12/1995 Woo et al.
5,642,285 A 6/1997 Woo et al.
(Continued)

OTHER PUBLICATIONS

Eugster, et al., UAV-Based Augmented Monitoring-Real-Time Georeferencing and Integration of Video Imagery with Virtual Globes, The International Archives of the Photogrammetry, Remote Sensing and Spatial Information Sciences, 2008, vol. XXXVII, Part B1, pp. 1229-1236.
(Continued)

*Primary Examiner* — Mishawn N. Hunter
(74) *Attorney, Agent, or Firm* — Knobbe, Martens, Olson & Bear, LLP

(57) ABSTRACT

A method for synchronizing an audio track that is being recorded at a first location with a video track that is being recorded at a second location, such as on a flying UAV, is disclosed. First, the audio and video recorders being to record sound and video. Then, a GPS receive is used to pick up the very accurate GPS clock signal. A real-time clock is also used locally to generate a real-time value. At a predetermined time, the GPS time data is interrogated and a time-stamp is generated. A video encoder is then used to embed the time-stamp, either during recording, or shortly thereafter. A networked audio recording device records audio with a time stamp acquired from the network. These respective time-stamps are then used in post-processing to accurately synchronize the audio and video tracks.

13 Claims, 4 Drawing Sheets

(51) Int. Cl.
H04N 21/43 (2011.01)
H04N 21/84 (2011.01)
H04N 21/8547 (2011.01)

(52) U.S. Cl.
CPC ... *G11B 20/10527* (2013.01); *H04N 21/4302* (2013.01); *H04N 21/84* (2013.01); *H04N 21/8547* (2013.01); *B64C 2201/127* (2013.01); *G11B 2020/10546* (2013.01)

(56) References Cited

U.S. PATENT DOCUMENTS

| | | | |
|---|---|---|---|
| 2007/0081789 A1* | 4/2007 | Winick | G11B 27/105 386/229 |
| 2010/0149331 A1 | 6/2010 | DiMare et al. | |
| 2013/0021475 A1* | 1/2013 | Canant | H04N 5/33 348/144 |
| 2014/0348140 A1* | 11/2014 | Atkinson | H04L 12/417 370/336 |
| 2015/0168144 A1* | 6/2015 | Barton | G01C 11/02 348/144 |

OTHER PUBLICATIONS

Zhou, Geo-Referencing of Video Flow From Small Low-Cost Civilian UAV, IEEE Transactions on Automation Science and Engineering, 2010, vol. 7, No. 1, pp. 156-166.

International Search Report and Written Opinion of the International Search Authority issued in PCT/US2016/044091 dated Oct. 28, 2016.

* cited by examiner

SYSTEM FOR RECORDING AND SYNCHRONIZING AUDIO AND VIDEO ASSOCIATED WITH A UAV FLIGHT

CROSS-REFERENCE TO RELATED APPLICATIONS

This application claims the benefit of U.S. Provisional Application No. 62/197,493, filed Jul. 27, 2015, entitled SYSTEM FOR RECORDING AND SYNCHRONIZING AUDIO AND VIDEO ASSOCIATED WITH A UAV FLIGHT, which is hereby incorporated by reference in its entirety.

BACKGROUND

Technical Field

Embodiments described herein relate to systems used to create video content including audio and video tracks in connection with unmanned aerial vehicles (UAVs) during flight, and more particularly, to synchronizing the resulting audio and video tracks.

SUMMARY

In one aspect, a method for encoding time stamp information within a video recorded using an unmanned aerial vehicle (UAV), is disclosed, the method including receiving GPS (global positioning system) time information using a GPS receiver on the UAV, providing the GPS information to a real-time clock on the UAV to trigger the real-time clock, initializing video recording via a camera supported by the UAV, and encoding time data from the real-time clock into the video recording using a video encoder on the UAV.

The time data can include the start time of the UAV video recording, where the start time is synchronized with an absolute time reference from the GPS time information. Triggering the real-time clock can include receiving a GPS pulse signal, and extracting and storing the GPS time and date information in memory. Receiving a GPS pulse signal can include receiving a GPS pulse signal via a GPIO port. Encoding time data from the real-time clock into the video recording can include generating at least one time stamp using the real-time clock based on the stored GPS time and date information in response to initializing video recording, and transmitting the at least one time stamp to the video encoder on the UAV. Initializing video recording can include sending a request to the real-time clock via a GPIO port.

Encoding time data from the real-time clock into the video recording can include including time stamp data in a metadata field of the video recording. The method can additionally include receiving an audio recording made at least partially simultaneously with the video recording, where the audio recording is synchronized with an absolute time reference, and merging the video recording with at least a portion of the audio recording using the video encoder on the UAV to generate a video recording including synchronized audio. Merging the video recording with at least a portion of the audio recording can include merging the video recording with at least a portion of the audio recording using the video encoder on the UAV. The real-time clock can include a 16-bit counter and a 32.769 kHz oscillator.

In one aspect, an unmanned aerial vehicle (UAV) configured to generate video recordings synchronized with an absolute time reference is provided, the UAV including a camera, a Global Positioning System (GPS) receiver, a real-time clock configured to receive GPS time information from the GPS receiver, a video encoder configured to generate video recordings including at least one time stamp received from the real-time clock and synchronized with an absolute time reference.

In one aspect, a method for synchronizing an audio track recorded at a first location with a video track recorded at a second location is provided, the method including the steps of activating the audio recording at the first location and the video recording at the second location, using a GPS to generate location data and a GPS time-stamp, based on satellite triangulation and a system-wide GPS clock signal, using an electronic clock to generate a real-time value triggering the real-time generator, extracting time data from the GPS receiver at a first predetermined time, in response to the real-time generator being triggered, encoding the time data onto one of the audio track and the video track at a second predetermined time, and referencing the encoded time data to synchronize the audio track with the video track.

The second location can be an airborne UAV. The triggering step can occur when the UAV is powered on. The GPS receiver can be located at the first location. The GPS receiver can be located at the second location. The GPS receiver can be located on a UAV.

In one aspect, a method for synchronizing a first recorded track and a second recorded track is provided, the method including the steps of activating the first and second recordings, generating a time-stamp value based on a GPS clock, generating a real-time value, encoding the GPS time-stamp value onto at least one of the recorded tracks at a predetermined time, and referencing the encoded GPS time-stamp value to synchronize the recorded tracks.

A method for synchronizing an audio track that is being recorded at a first location with a video track that is being recorded at a second location, such as on a flying UAV, is disclosed. First, the audio and video recorders begin to record sound and video. Then, a GPS receiver is used to pick up the very accurate GPS clock signal. A real-time clock is also used locally to generate a real-time value. At a predetermined time, the GPS clock signal is interrogated and a time-stamp is generated. A video encoder is then used to encode the time-stamp on both the audio and video tracks, either during recording, or shortly thereafter. These time-stamps are then used in post-processing to accurately synchronize the audio and video tracks.

The accompanying drawings show examples of various embodiments.

DETAILED DESCRIPTION OF THE PREFERRED EMBODIMENT

Figure 1:
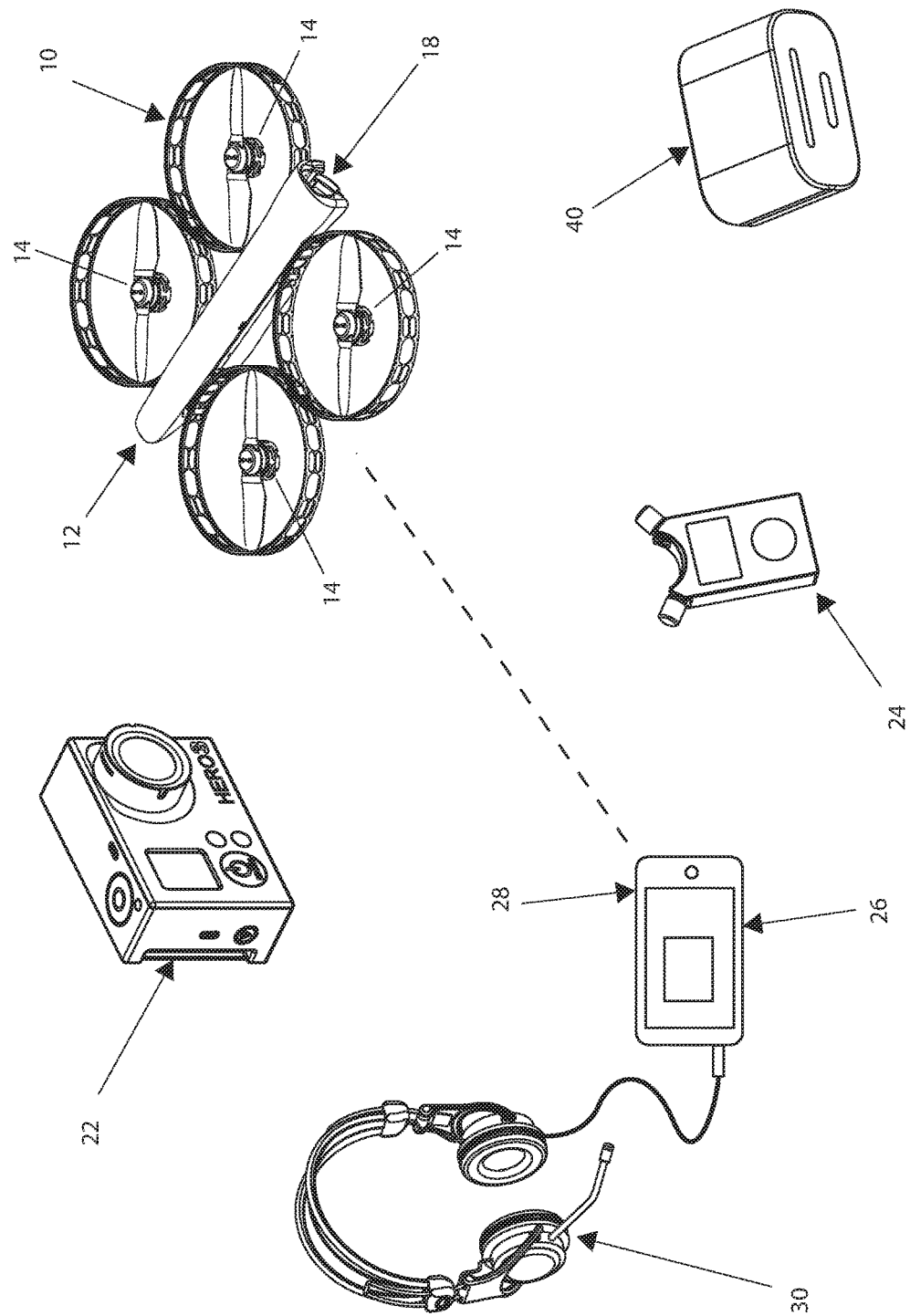
FIG. 1 is an exemplary schematic showing various recording and UAV control devices, a speaker, and a UAV.

Since the beginning of motion picture "talkies," it has been common to record audio and video (or motion images) using separate recording systems. Difficulties would often arise during so-called post-processing, when the audio track had to be aligned or synchronized perfectly with the video (or image) track so that a seamless motion picture with accurate sound would be created. If the alignment process failed, the result would be "lip-flap" or "lip-sync," wherein the moving lips of an actor on the screen would not match the sound in the theater.

Over the years, a common method to establish a reference point on both tracks during filming included the use of a so-called "clapperboard." This simple and now familiar device included a board structure, onto which scene, camera angle, and other information could be posted, and a pivotal mechanical arm, called a "clapstick" that could be selectively manually slapped against the top edge of the board. The result was a single clap sound and a visual showing of the arm meeting flush with the edge of the board. The clapperboard was operated within the scene about to be shot, within the focal plane of the camera and within earshot of the microphone during recording of both picture and sound. The camera would capture the visual cue when the clap stick exactly contacted the edge of the board at a specific reference point on film. The audio system would similarly capture an audible cue (the clap) at a specific reference point on tape. To synchronize the picture and sound, the reference points needed only to be aligned in post-processing.

This clapperboard system worked well in studios or in closely controlled scenes where there is only one picture-taking camera, but proved less accurate when the camera was positioned remote from a particular subject (the location of the audio pickup—the microphone), or several cameras were being used to simultaneously film a particular scene. In such instances, owing to the relative distance between a camera and the clapperboard, the exact visual cue reference point would at times be difficult to discern from a single camera, let alone several.

Finally, depending on the quality of the equipment, it was not uncommon for the audio and video to slip out of sync during recording, regardless of using the clapperboard prior to each scene.

To help improve these synching deficiencies, other methods were later developed for synching an audio track with a visual track, such as the use of a "timecode".

A timecode provides an index to each frame (or the equivalent period of time for an audio recorder) so that it can be identified uniquely during post-processing.

If it is required to synchronize multiple cameras, or a camera and audio recorder, use of a timecode is effective. A problem is that use of a timecode alone, while sufficient to provide syncing points for post production, may not be a reliable way to keep devices in sync with each other.

Even timecodes can drift apart and cause inaccurate synching, unless the cameras or recorders are re-jam-synced frequently. This is due to the quartz crystal (or other piezo-electric material) that clocks use in many cameras and most audio recorders being too imprecise for critical applications. In other words, two different clocks may have two different opinions on how long a second is, causing recordings to drift apart over time. Depending on the camera and the recorder being used, the timecode may drift as much as a field in a relatively short period of time. Even a field offset is enough variation to cause sound and picture to become visibly out of sync when combining the elements later, in post-processing.

An improved approach was subsequently developed to help overcome synching issues linked to inaccuracies of onboard clocking crystals. This approach synced multiple devices in the field by continuously feeding a timecode to them using a wireless audio transmitter and receiver. A type of composite signal timecode, such as SMPTE 12M LTC is passed as an analog audio signal, and produces a well-know "telemetry noise" when played through speakers. App-driven programs are available to provide timecode synchronization over WiFi. Although potentially useful, this method of synching with timecodes is only as good as the available WiFi at the location of the shoot. WiFi is inherently unreliable in remote areas, and the WiFi transmitter and receiver circuitry is known to introduce delays during digitally processing signals. If, during a shoot, a WiFi signal strength fails, the camera systems are designed to revert to their backup timecode system, using the onboard timing crystals, which again cause their own set of issues of inaccuracies, as mentioned above.

Certain embodiments discussed herein are related to improvements in the synchronizing of a recorded audio track, located at a first location within a scene of interest, with a recorded video track taken at a second location, remote from the first location. The area of improved synchronizing is directed to airborne videography wherein a video recorder is mounted to and operates from a flying UAV or "drone."

As used herein, an Unmanned Aerial Vehicle (UAV) can be a flying device that is controlled either by a user via a radio-frequency (RF) data link, or by autonomous control by an on board program. One common type of UAV is a quadcopter which has four motor driven propellers. When controlled in real time by a user, a ground station is used for adjusting flight parameters such as altitude, velocity, and orientation. UAVs may include an on-board camera that can be aimed with additional controls on the ground station.

As used herein, a Personal Computing Device can refer to or include a general purpose computing device that includes a computing hardware subsystem running an operating system, a display, an input device, RF connectivity, and the ability to install and run software applications. Examples are a notebook or desktop personal computer, a tablet, or a smartphone.

As used herein, a Ground Station can refer to or include a device with a user interface for inputting UAV flight control commands in real time, or otherwise transmitting control data to a UAV via an RF communication link. In the embodiments disclosed herein the RF communication link is WiFi.

As used herein, a Flight Control Application can refer to or include a software application running on a ground station used to control the flight of the UAV.

A clapperboard is a device used in filmmaking and video production to assist in the synchronizing of picture and sound, and to designate and mark particular scenes and takes recorded during a production. The sharp "clap" noise that the clapperboard makes can be identified easily on the audio track, and the shutting of the clap stick can be identified easily on the separate visual track. The two tracks can then be precisely synchronized by matching the sound and movement.

Figure 2:
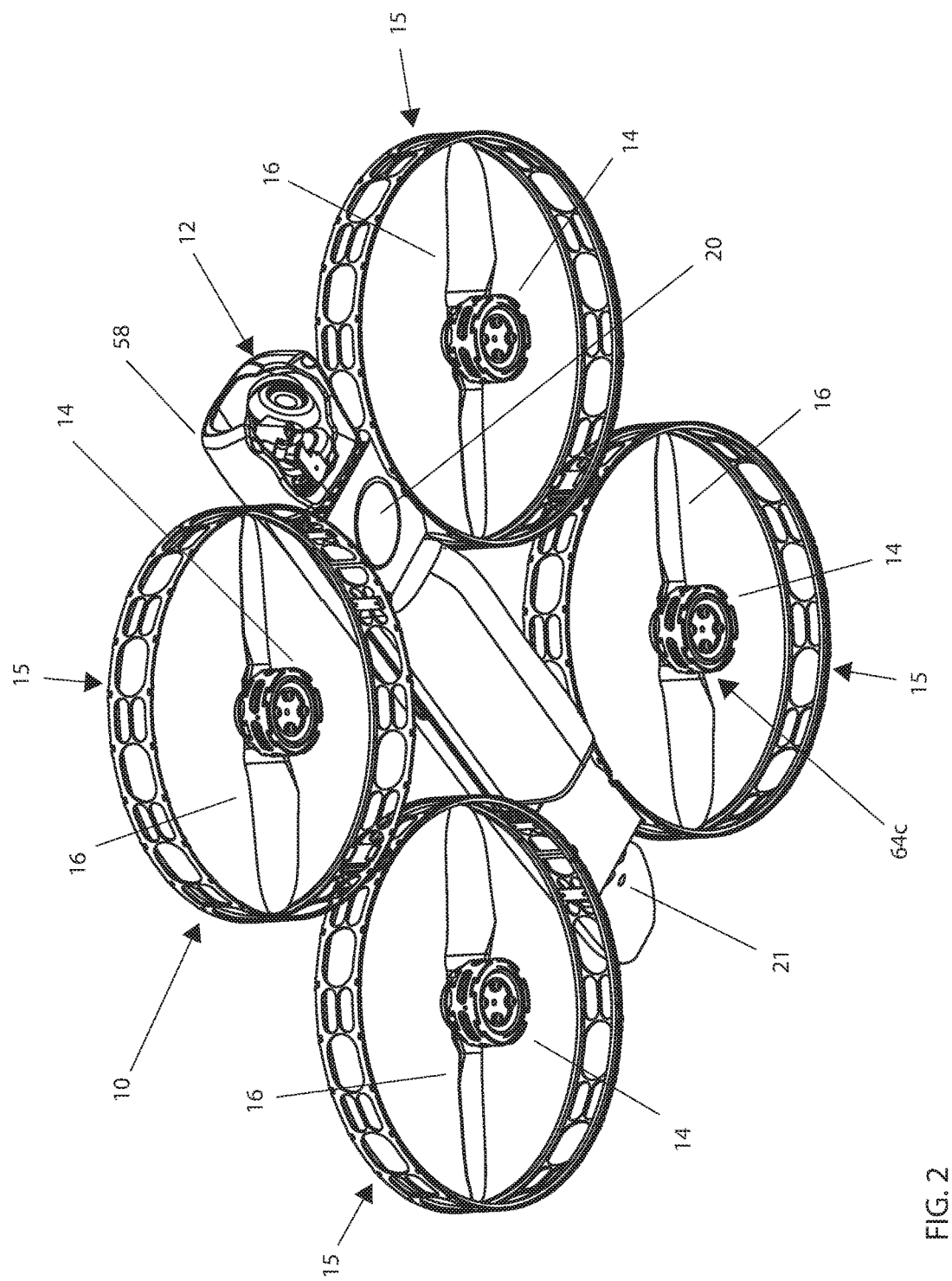
FIG. 2 is a lower perspective view of an exemplary UAV, showing a speaker.

In one embodiment, described herein with respect to FIGS. 1 and 2, a UAV 10 is shown including a fuselage 12, motors 14, each driving a propeller 16, an onboard camera system 18 (which includes an image sensor and a video and still image encoding microprocessor, and memory located within fuselage 12). Fuselage 12, according to at least this embodiment, also supports a speaker 20 (controlled by onboard operating circuitry) which is preferably a piezoelectric type transducer, and a microphone 21, for providing audio data to be encoded onto the video track of onboard camera 18. UAV 10 also includes a WiFi communication circuitry 32 and a GPS receiver 34 (both shown in FIG. 3 and further described below).

Also shown is a ground-based portable handheld camera 22, a ground-based audio recording device 24, a ground-based UAV controller 26 (also referred to as a "ground-station"), a smartphone 28 (in this example, smartphone 28 is used as UAV controller 26). UAV controller 26 includes flight-control software for controlling UAV 10, wireless communication capabilities (e.g., WiFi and Bluetooth®) and a GPS receiver.

Details of the flight operations of UAV 10 is beyond the scope of this immediate description, except to say that UAV flight operations can in some embodiments be controlled by a ground-based UAV controller 26 and on-board flight-control software. Connected to smartphone 28 is a headset 30 with speakers and a microphone.

Handheld camera 22 can be any appropriate video camera, such as a GoPro Hero 3. Audio recording device 24 can be any appropriate audio recording device 24, such as a Tascam DR-40 digital audio recorder.

According to this embodiment, circuitry onboard UAV 10 is used to power speaker 20 at a prescribed moment during video recording so that a brief controlled synchronization sound is emitted from speaker 20 with sufficient amplitude and duration to be clearly picked up and recorded by the active recording devices used on the set, including, in this example, portable handheld camera 22 and audio recording device 24. This generated synchronization sound is also recorded on the audio track of onboard camera system 18 through microphone 21. The captured synchronization sound creates a identifiable audio signal spike on the audio track of ground-based audio recording device 24. This spike can then be used used in the video editing process (post-processing) to synchronize the separate audio recordings with the video recorded by UAV 10, as is understood by those skilled in the art.

As described above, UAV-based speaker 20 which generates the synchronization sound is located on UAV 10. According to another embodiment, a ground-based speaker 40, as shown in FIG. 1, is used to generate the a synchronization sound. In this embodiment, speaker 40 includes an appropriate power source, such as a battery (not shown), appropriate amplifier and driver circuitry (not shown), and appropriate wireless communication circuitry (not shown), such as Bluetooth® communication circuitry. Ground-based speaker 40 may be any appropriate speaker system, such as UE Mini Boom Bluetooth speaker manufactured by Logitech of Fremont, Calif.

In operation of this embodiment, the flight control software program located within UAV controller 26 controls the generation of the synchronization sound from speaker 40, preferably by streaming a synchronization-sound digital sound file to speaker 40 by way of wireless communication. As in the embodiment described above, the synchronization sound emitted by speaker 40 can be recorded by all recorders in the vicinity and can then be used to synchronize audio and video tracks in post-processing.

In one particular embodiment, the synchronization sound emitted by either ground-based speaker 40 or UAV-based speaker 20 has a frequency of about 4 kHz, a time interval of approximately 0.25 seconds, and a sound level of about 90 decibels. A wide range of other frequencies, time intervals, and sound levels may also be used, depending on the particular configuration and other factors.

In one embodiment audio recording 6 encoding format is the MP3 format. In another embodiment the audio encoding format for recording 6 is the Free Lossless Audio Compression (FLAC) format. In some embodiments, a headset assembly 24 can be used in place of the built-in microphone of the smartphone 10a.

In operation and according to the embodiments described above, ground-based portable handheld camera 22, ground-based audio recording device 24, and smartphone 28 are set up at the UAV filming site and audio recording is activated by the user. Sound recording on smartphone 28, UAV controller 26, and UAV 10 commences automatically at the start of a UAV flight as controlled by the onboard flight control software program located on UAV 10 and on smartphone 28. Either UAV-based speaker 22 or ground-based speaker 40 is activated to generate a synchronization sound a preset time period after the start of UAV flight (such as five seconds after the activation of UAV motors 14). The delay time for generating the synchronization sound through speakers 20 or 40 is a programmable setting in the flight control software program.

As described above, the generated synchronization sound is recorded by all nearby recording devices on their respective audio tracks. The audio and video tracks from both the ground-based and UAV-based recorders are then uploaded to a personal computer (not shown). Conventional video editing software, installed on the computer, such as Final Cut Pro, available by the Apple Computer Company of Cupertino, Calif. is then used to combine a select audio track with a select video track. The synchronization spike located on the audio track is used to synchronize the audio and video tracks. The exact techniques for combining and synchronizing audio recordings will not be described in detail as they are well known to one skilled in art of video editing.

In some embodiments, an editing program can be located within smartphone 28 and automatically (using the synchronizing spike) merges the audio file recorded on smartphone 28 and the video file recorded by the onboard UAV camera 18, which is uploaded to smartphone 28 from UVA 10 by way of WiFi. Alternatively, a web server (not shown) includes an audio merging software program which manages the automatic transfer of a recorded audio file from smartphone 28 and a video file from UAV 10 to the web server. Also, the audio file can be transferred to UAV 10 from smartphone 28 via WiFi and merged on UAV 10 using appropriate software.

Other combinations are contemplated. The merging software may be located on UAV 10, smartphone 28, UAV flight controller 26 (ground station), a server or other remote computer, or any other appropriate device. In such instance, the device that includes the merging software would receive the audio and video files from the other devices to perform the necessary merging, again using the synchronization spike created by generating the synchronization sound, as described above.

Figure 3:
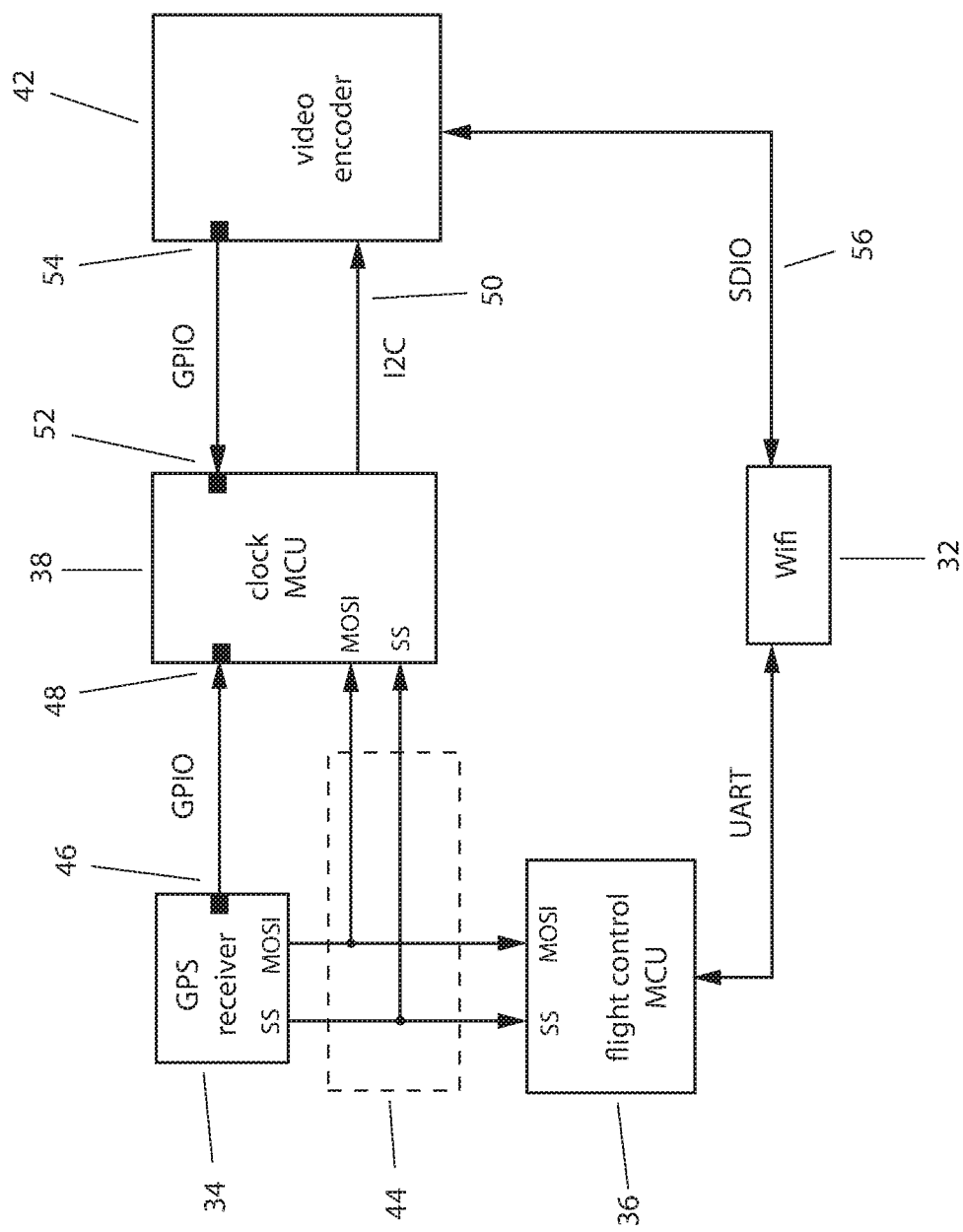
FIG. 3 is a block diagram of a time-stamp synch hardware subsystem.

In another embodiment, described with respect to FIG. 3, a block diagram of a time-stamp sync subsystem is shown, including a GPS receiver 34, a flight control MCU 36, a real-time clock MCU 38, a video encoder 42 and a WiFi communication system 32. GPS receiver 34 is functionally connected to flight control MCU 36 and real-time clock MCU 38 by a Serial Peripheral Interface (SPI) bus 44. GPS receiver 34 is the SPI master and both flight control MCU 36 and clock MCU 38 are SPI slave devices connected to the same slave select line and thus receive the same data at the same time from GPS receiver 34. In some embodiments, GPS receiver 34 transmits GPS data periodically at 1 hertz. In addition to GPS location coordinate data, GPS data includes GPS time data that includes a date value (ddmmyy) and an absolute time value (hhmmss.sss).

In addition to sending GPS time data, GPS receiver 34 also provides a precise periodic time pulse signal at 1 hertz associated with the absolute time value. This periodic time pulse is presented as a logic signal on GPIO port 46 of GPS receiver 34 which is connected to a GPIO port 48 on real-time clock MCU 38, as shown in FIG. 3.

Real-time clock MCU 38 includes a 16-bit counter and a 32.768 kHz oscillator that together provide precise real-time clock time keeping. Real-time clock MCU 38 can be an ATxmega8E5 8-bit microcontroller manufactured by Atmel Corporation of San Jose, Calif., although any other suitable device may also be used.

As shown in FIG. 3, real-time clock MCU 38 is connected to video encoding processor 42 by an I2C bus 50. A GPIO port 52 on real-time clock MCU 38 is connected to a GPIO port 54 on encoding processor 42. GPIO port 52 is associated with an interrupt in real-time clock MCU 38. Encoding processor 42 is connected to WiFi communication system 32 via an SDIO communication interface 56.

A time-stamp firmware application can run on real-time clock MCU 38 and can serve the following functions:
 a) Starts a counter within real-time clock MCU 38 when the first GPS time pulse signal is received at GPIO port 48, after UAV 10 is powered on;
 b) Parses a first GPS data received to extract and store the instant GPS date and GPS absolute time value of the precedent GPS time pulse in memory;
 c) Generates a time-stamp in response to receiving a high logic level at GPIO port 52;
 d) Stores the date value and time-stamp data; and
 e) Transmits the date value and time-stamp data to video encoder 42 via I2C interface 50.

A software encoding program operating onboard video encoder 42 includes an encode start-flag subroutine which controls the state of GPIO port 54 on video encoder 42 such that when the video encoder is not encoding video, GPIO port 54 is set to a low logic state. Encode start-flag subroutine includes a command to set GPIO port 54 to a high logic state after the software encoding program is initialized. This command is the last command executed before the first frame of video is encoded. The result here is that GPIO port 54 will transition to a high state at substantially the same time that the video recording begins. The software encoding program also includes a software function for receiving date value data and time-stamp data from clock MCU 38 via I2C interface. Once received, the software encoding program modifies a time video file of the received video track to include time-stamp data and date value in a metadata field. In other words, when UAV 10 energizes motors 14, a GPS time-stamp will be generated and this time-stamp will be encoded onto the video track that has just started to record. The encoded time-stamp will be synchronized with an absolute time reference.

Smartphone 28, such as an iPhone 6 manufactured by Apple Computer of Cupertino, Calif., runs an audio recording time-stamp application which records audio. The Apple iOS Developer Library supports an NSDate object, which provides methods for creating dates, comparing dates, and computing intervals with millisecond precision. NSDate is implemented using the Network Time Protocol standard, which is a networking protocol for synchronizing computer clocks over asynchronous communication networks. Therefore audio recording time-stamp application can create an audio time-stamp that is substantially at the same moment that audio begins recording on the device 28, and with the generated audio time-stamp being substantially synchronized with an absolute time reference.

According to another embodiment, an audio recording time-stamp function can be included, as a software program in UAV controller 26 (ground station). A user setting provides the function of automatically starting audio recording when UAV 10 is launched (motors are energized).

In operation here, a user first launches the flight control application within UAV controller 26. In this embodiment, the flight control application includes an audio recording time-stamp function, which automatically starts recording audio and a recording GPS time-stamp will be generated. When the flight of UAV 10 is completed, audio recording will be modified to include the recording GPS time-stamp in a metadata field located on the audio track.

Figure 4:
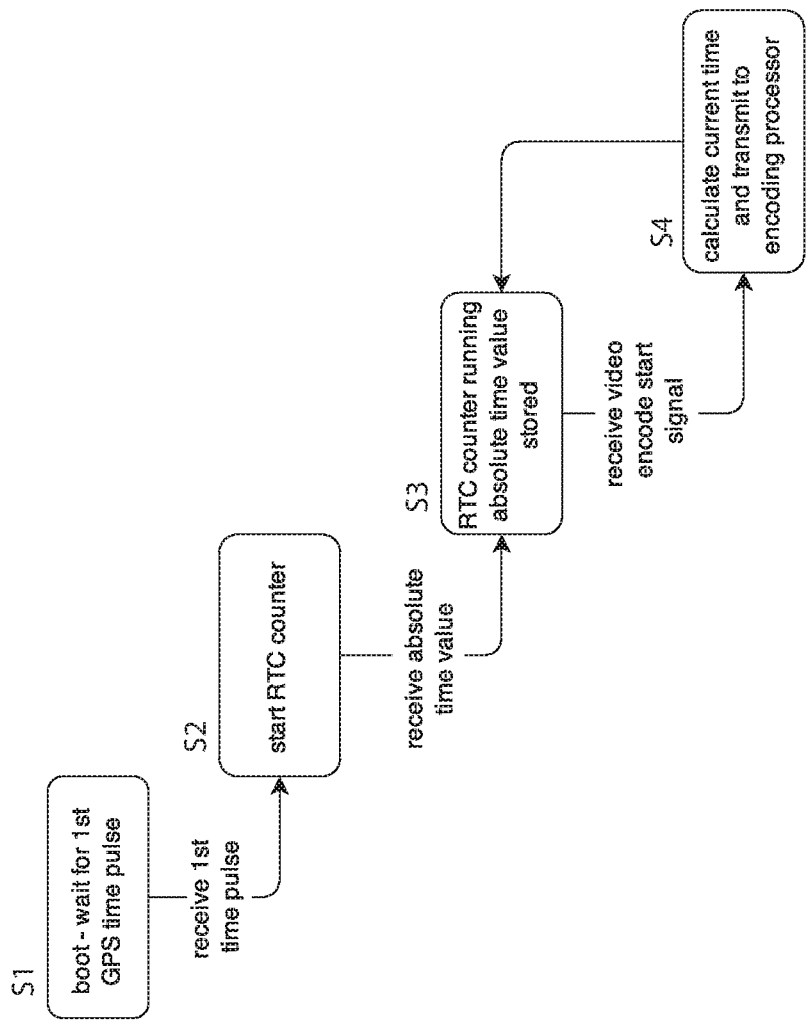
FIG. 4 is a state diagram of a time-stamp sync subsystem.

Referring now to FIG. 4, a state diagram is shown for time-stamp synchronizing subsystem at the moment that real-time clock MCU 38 begins executing the time-stamp firmware.

State 1 (S1) shows a real-time clock MCU 38 remaining idle until a first time pulse is received from GPS receiver 34 at GPIO port 46, as shown in FIG. 3. First GPS time pulse triggers an interrupt whereby real-time clock MCU 38 enters State 2 (S2) and time-stamp firmware starts a counter within real-time clock MCU 38. State 3 (S3) occurs when real-time clock MCU 38 receives and stores GPS date value and absolute time value associated with the GPS time pulse, from GPS receiver 34. State 4 is reached when the encode start flag function is executed, which drives GPIO port 54 high and which in turn triggers the time-stamp application to calculate a substantially accurate time-stamp (V) with the start of video recording, using the following formula:

$$V=A+E-C$$

where:
 V=video recording start time-stamp 66 (DDMMYY, HHMMSS.SSS)
 A=absolute time value
 E=real-time clock 38 elapsed time counter value
 C=software latency adjustment value Real-time clock MCU 38 saves the time-stamp in memory and then transmits the time-stamp to video encoder 42 via I2C bus 50, referring to FIG. 3. The software encoder within video encoder 42 receives the time-stamp information and after the flight of UAV 10 has completed, the software encoder modifies the video recording file to include the time-stamp in a metadata field.

In one embodiment, after the UAV flight has completed, the audio recording is uploaded to UAV 10 via WiFi communication or any other suitable communication protocol. An audio merging software running on video encoder 42 merges and synchronizes the audio recording with the video recording by aligning the audio recording based on the offset between the video time-stamp value and the audio recording time-stamp.

In another embodiment, after UAV flight has completed, the audio recording and the video recording are both uploaded to a remote web server which includes audio merging software. The software merges and synchronizes the audio recording with the video recording, again by aligning the audio recording based on the offset between the video time-stamp value and the audio recording time-stamp.

According to another embodiment, smartphone 28, which in this example functions as a "ground station," records audio during a UAV flight and recording "packets" are transmitted to UAV 10 as they are recorded during the flight via WiFi. The audio packets include GPS time-stamp data. UAV 10 includes real-time audio merging software. In one embodiment, the real-time audio merging software combines audio packets with video recorded on UAV 10 in substantially real time, during the flight as a separate audio track.

According to yet another embodiment, and referring to FIG. 2, UAV 4 includes four thrust pods 15, each of which include motor 14 and propeller 16, as described above. During operation, each thrust pod 15 will emit sound during flight, the frequency of which will vary with the power applied to motor 14 and other factors. A motor controller (not shown) located within fuselage 12 controls the speed of each motor 14 to maintain control of and to maneuver UAV 10, according to control commands, with the result that the sound emitted by each thrust pod 15 varies distinctively.

Based on this, audio recorded using microphone 21 onboard UAV 10 and other ground-based audio recording devices will pick up the sound from pods 15 during flight. The "pod sound" can be used to synchronize the audio and video tracks by matching the audio signals in the digital domain. There are many commercially available computational algorithms that can effectively match digitized audio. For example, one algorithm developed by Avery Wang and described in the publication, entitled: An Industrial-Strength Audio Search Algorithm, uses a combinatorial hashed time-frequency constellation analysis of the digitized audio that efficiently generates a hash-time offset record for a portion of each of audio recording and audio track in the video recording. The hash-time offset records include temporal points that are used to align the audio recordings.

In some embodiments, a sound profile matching software application can run on video encoder 42 and is used to merge and synchronize an audio recording made with a ground-based (or remote) audio recording device with the video recording made by UAV 10 during a flight. After the flight of UAV 10 has completed, the audio recording file is uploaded to UAV 10 via WiFi or another suitable communication protocol. The sound profile matching software executes a matching algorithm on the audio file from a ground-based audio recorder and also on the audio track component of the video recording, replacing the audio track of the video recording with the audio track recorded by a ground-based audio recorder, wherein the latter audio track is synchronized with the visual action in the video.

As in above-described embodiments, the sound profile matching software application can also run on a remote web server and is used to merge and synchronize an audio recording made with an external audio recording device, with a video recording made by UAV 10, during a flight. After the flight of UAV 10 has completed, each of the audio recording file and the video recording are uploaded to the web server via WiFi to the Internet. The sound profile matching software executes a matching algorithm on the audio file and on the audio track component of the video recording, replacing the video's audio track with the ground-based audio track, wherein the latter audio track is synchronized with the visual action in the video.

According to yet another embodiment wherein a UAV flight is recorded by an external video recording device 22, for example the GoPro Hero 3, shown in FIG. 1. Referring to FIG. 2 and according to this embodiment, an LED (not shown), or another illumination source is mounted to fuselage 12 of UAV 10. The LED may be mounted in such a manner that its direct illumination is visible from outside UAV 10 or may be mounted within fuselage 12 and its illumination guided by way of a light-pipe 58 from the location of the LED to a point of fuselage 12 that allows such illumination to be seen from outside the UAV. The LED may be driven in a flashing manner (being turned on and off rapidly), using well known techniques, to provide a visible synchronizing signal that can be recorded by remote video recorders and used to synchronize audio and video tracks or separate video recordings in post-processing. The LED is preferably activated about 5 seconds after the start of the flight of UAV 10.

In the embodiments described above, the recording of external audio content is typically used to describe the operation of the various embodiments. However it should be noted that the media synchronization embodiments described herein can also be used in the synchronization of external video tracks.

As described herein, the various functions and steps may be provided in software, hardware, or some combination. Whether functionality is provided in software or hardware may depend on the particular application. Various embodiments may use a general-purpose processor, application-specific hardware or circuitry, or any appropriate combination of a general-purpose processor and application-specific hardware or circuitry. When implemented in software, the functions may be stored or transmitted as instructions or code on a computer-readable medium, such as a processor-executable software module.

In the foregoing description, specific details are given to provide a thorough understanding of the examples. However, it will be understood by one of ordinary skill in the art that the examples may be practiced without these specific details. Certain embodiments that are described separately herein can be combined in a single embodiment, and the features described with reference to a given embodiment also can be implemented in multiple embodiments separately or in any suitable subcombination. For example, electrical components/devices may be shown in block diagrams in order not to obscure the examples in unnecessary detail. In other instances, such components, other structures and techniques may be shown in detail to further explain the examples.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for encoding time stamp information within a video recorded using an unmanned aerial vehicle (UAV), the method including:
   receiving GPS (global positioning system) time information using a GPS receiver on the UAV;
   providing the GPS information to a real-time clock on the UAV to trigger the real-time clock;
   initializing video recording via a camera supported by the UAV; and
   encoding time data from the real-time clock into the video recording using a video encoder on the UAV.

2. The method of claim 1, wherein the time data includes the start time of the UAV video recording, wherein the start time is synchronized with an absolute time reference from the GPS time information.

3. The method of claim 1, wherein triggering the real-time clock comprises:
receiving a GPS pulse signal; and
extracting and storing the GPS time and date information in memory.

4. The method of claim 3, wherein receiving a GPS pulse signal comprises receiving a GPS pulse signal via a GPIO port.

5. The method of claim 3, wherein encoding time data from the real-time clock into the video recording comprises:
generating at least one time stamp using the real-time clock based on the stored GPS time and date information in response to initializing video recording; and
transmitting the at least one time stamp to the video encoder on the UAV.

6. The method of claim 5, wherein initializing video recording comprises sending a request to the real-time clock via a GPIO port.

7. The method of claim 1, wherein encoding time data from the real-time clock into the video recording comprises including time stamp data in a metadata field of the video recording.

8. The method of claim 1, additionally comprising:
receiving an audio recording made at least partially simultaneously with the video recording, wherein the audio recording is synchronized with an absolute time reference; and
merging the video recording with at least a portion of the audio recording using the video encoder on the UAV to generate a video recording including synchronized audio.

9. The method of claim 8, wherein merging the video recording with at least a portion of the audio recording comprises merging the video recording with at least a portion of the audio recording using the video encoder on the UAV.

10. The method of claim 8, additionally comprising initializing the audio recording, wherein the audio recording occurs at a location different than a location of the UAV.

11. The method of claim 10, wherein initializing the video recording via a camera supported by the UAV occurs when the UAV is airborne.

12. The method of claim 8, wherein the audio recording is an audio recording recorded by a device including a GPS receiver, and wherein the audio recording comprises encoded time data extracted from the GPS receiver of the audio recording device, to synchronize the audio recording with the absolute time reference.

13. The method of claim 1, wherein the real-time clock comprises a 16-bit counter and a 32.768 kHz oscillator.

\* \* \* \* \*